(12) United States Patent
Crane et al.

(10) Patent No.: US 6,283,284 B1
(45) Date of Patent: Sep. 4, 2001

(54) STORAGE CASE WITH PIVOTAL FLAP FOR RETAINING DISKS THEREON

(75) Inventors: Robert Crane, Biddeford; Craig Lovecky, Old Orchard Beach, both of ME (US)

(73) Assignee: Shape Global Technology, Sanford, ME (US)

( * ) Notice: Subject to any disclaimer, the term of this patent is extended or adjusted under 35 U.S.C. 154(b) by 0 days.

(21) Appl. No.: 09/416,716

(22) Filed: Oct. 13, 1999

(51) Int. Cl.⁷ .................................................. B65D 85/57
(52) U.S. Cl. ........................ 206/310; 206/308.1; 206/309
(58) Field of Search ............................. 206/308.1, 309, 206/310

(56) References Cited

U.S. PATENT DOCUMENTS

| 4,793,480 | | 12/1988 | Gelardi et al. . | |
|---|---|---|---|---|
| 5,400,902 | * | 3/1995 | Kaminski | 206/310 |
| 5,558,220 | * | 9/1996 | Gartz | 206/308.1 |
| 5,685,427 | * | 11/1997 | Kuitems et al. | 206/310 |
| 5,713,463 | * | 2/1998 | Lakoski et al. | 206/308.1 |
| 5,746,314 | * | 5/1998 | Knutsen et al. | 206/308.1 |
| 5,788,068 | * | 8/1998 | Fraser et al. | 206/310 |
| 5,906,275 | * | 5/1999 | Jokic | 206/310 |

* cited by examiner

*Primary Examiner*—Paul T. Sewell
*Assistant Examiner*—Troy Arnold
(74) *Attorney, Agent, or Firm*—Pierce Atwood; Chris A. Caseiro; Patrick R. Scanlon

(57) ABSTRACT

A case for retaining disks therein. The case is preferably a two-piece structure formed of a lid and a base detachably coupled together. The base is formed to include a disk retainer that is rotatable with respect to the base. The retainer is coupled to a wall of the base using a living hinge that permits rotation of the retainer well away from the interior surface of the base. The retainer includes a modified hub for capturing the disk. The modified hub has a tongue-and-capturing-structure combination permitting easy application of the disk to the hub and removal therefrom with little stress on the disk. The lid is coupled to the base using a pair of rotatable cams that allow the lid to be rotatable well away from the base. The two-piece structure with the rotatable disk retainer and lid make the case of the present invention compatible with an array of automated disk packaging processes and equipment.

11 Claims, 9 Drawing Sheets

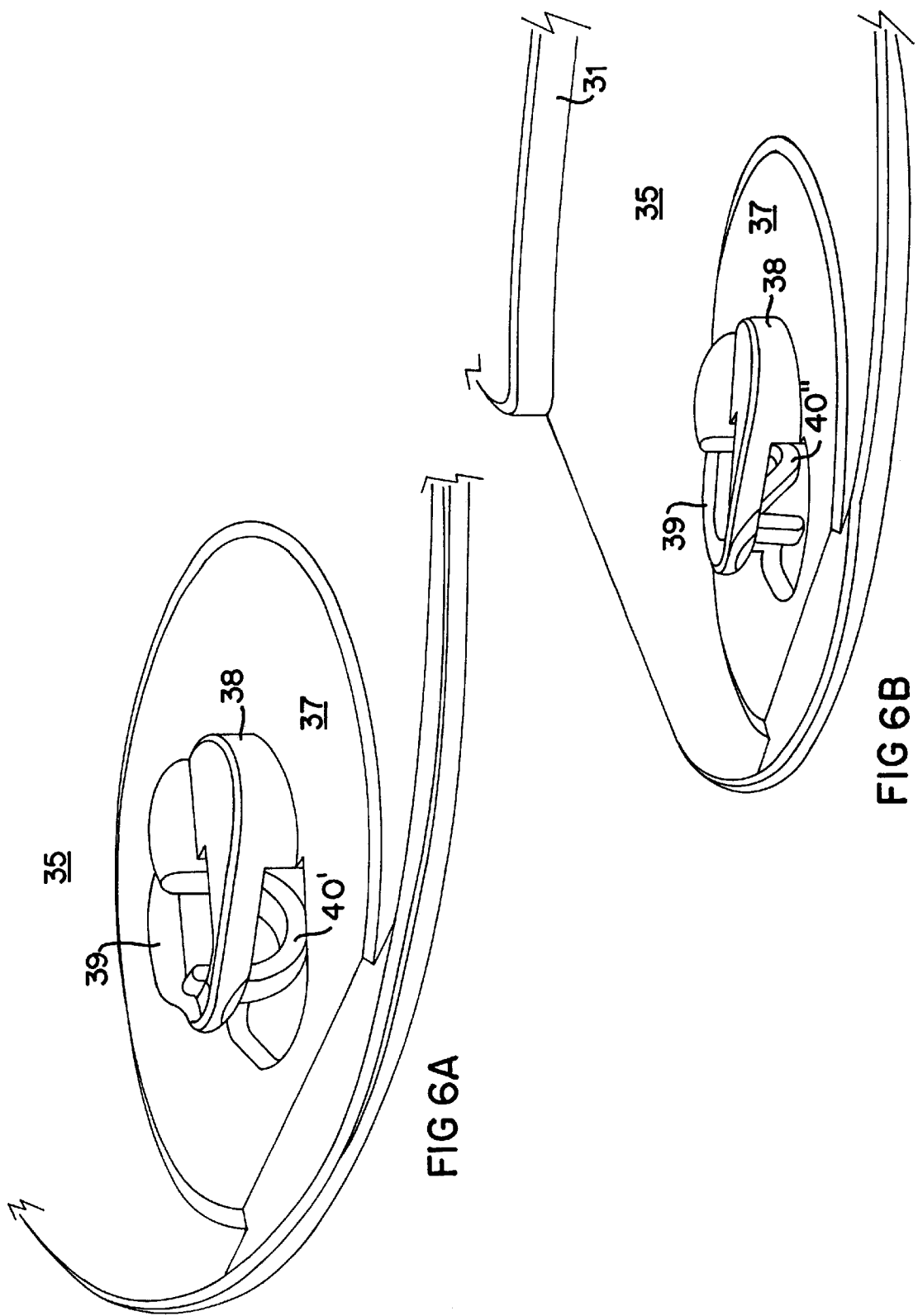

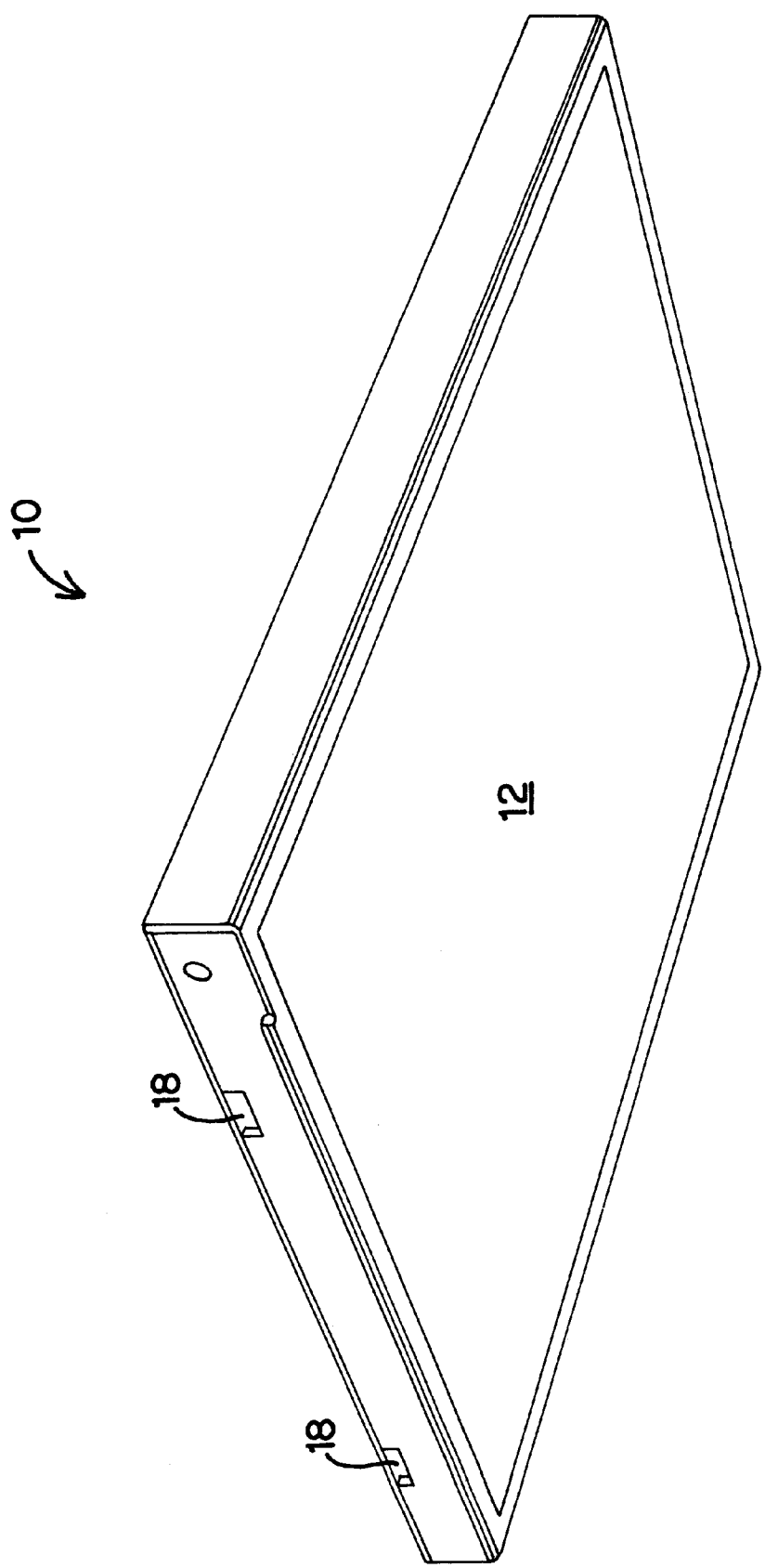

STORAGE CASE WITH PIVOTAL FLAP FOR RETAINING DISKS THEREON

BACKGROUND OF THE INVENTION

1. Field of the Invention

The present invention relates to cases for retaining disks therein. More particularly, the present invention relates to storage cases for securely retaining compact disks (CD), digital-video (or digital versatile) disks (DVD), and other mass storage devices therein. Still more particularly, the present invention relates to such storage cases including means for fixing the disk in place within the case. The present invention relates to a disk storage case having a pivotal flap for removably retaining the disk thereon.

2. Description of the Prior Art

The proliferation of optically readable mass storage media, such as CDs, computer Read Only Memory (ROM) disks, and, more recently, DVDs, has generated the need for relatively inexpensive cases for safely storing such disks therein. The most popular standard case for CDs is the jewel case, a transparent hinged three-part structure designed to retain the disk within. The jewel case has essentially become the industry standard for CDs. Its design has been used to define a portion of the CD manufacturing and packaging process. Specifically, the automated equipment used to form and enclose CDs in a case having informational, marketing, etc., graphical materials inserted therein, is designed to fit such materials within the faces of the case, and to fit the completed CD onto a stationary hub that fixes the CD in place within the case.

For the most part, the standard CD jewel cases are formed of three parts—two open-faced frames hingedly connected together, and a hub plate having a centered hub designed to fit within the inside diameter of the CD center hole. One of the frames has two opposing sidewalls, each of which has one or more tabs for retaining informational booklets, marketing booklets, or the like, and a transparent frame face for observing such materials therethrough. Each of the opposing sidewalls of that frame also includes a corresponding pivot nub for pivotal coupling to the second frame. The second frame of the standard existing jewel case includes a pair of opposing sidewalls, a pair of opposing endwalls, and a transparent frame face. It is to be noted that the frame faces of the respective open-faced frames define the length and width of the jewel case. The second frame is designed to retain therein graphical materials observable through the transparent frame face and through the transparent endwalls. The second frame includes means for removably fixing the hub plate therein, and its sidewalls have opposing corresponding indentations for receiving the nubs of the sidewalls of the first frame for pivotal movement thereof.

Different jewel cases manufactured by different suppliers may have hub plates of different designs. For the most part, however, they include a round depression sized slightly larger than the CD within which the CD sits. A relatively flexible rosette or hub rises from the centered of the depression and is designed to be of about the same size as the inside diameter of the center hole of the CD. The hub is typically designed to have some give such that when the CD is positioned in the depression and on the hub, there is a tight fit between the hub and the CD. In this way, the CD is supposed to remain within the depression of the hub plate until the user pops the CD off of the hub in a manner well known to most of the general population.

Unfortunately, in the automated process of making and packaging CDs, as with most automated manufacturing processes, there are many variables than can result in product outcome vagaries. Two areas of concern in regard to the present invention relate to the manufacture of the hub and the manufacture of the CD. Specifically, the hub to which the CD is removably joined may vary in dimensions as a function of the batch of material used to make the hub and its associated plate, the rate at which the hub plate is processed in the molding equipment and variability of the tools used to form the hub. Similarly, the CD manufacturing process and the process of moving the CD through an automated packaging process is a complex one. The CD is formed by first creating an emulsion-based mold having formed therein pits and peaks used to establish specific optically readable variations corresponding to desired electrical signals. A CD forming material, such as polycarbonate, for example, is then applied to the mold so as to create the CD structure.

DVDs are formed in a similar manner; that is, an emulsion-based mold is first created with the surface variations (pits and peaks) used to establish mirror-image peaks and pits in the surface of material that becomes the DVD. However, in order to increase the storage capacity of the storage medium, a pair of molded disks are joined together using a bonding material or mechanism suitable for the particular material used to form the disks. The effect, then, for a CD or a DVD is to create one or two layers of material designed to allow the passage of light therethrough on to the modified surface for reading of the variations corresponding to digital signals.

Clearly, given the complexity of the process, there are ranges of hub dimensions and CD or DVD aperture diameters. As a result, it is not uncommon for these disks either to be too loosely or too tightly coupled to the hub. That is, in those instances where the hub diameter is slightly smaller than nominal and the aperture inside diameter is slightly larger than normal, the disk may slip off the hub and fall unexpectedly out of the container or case upon opening. Alternatively, and more commonly, the hub diameter is slightly larger, the aperture is slightly smaller, or a combination of the two, and the disk fits tightly on the hub. In that situation, the user must exert considerable energy and cause a bending of the disk in order to pop it off the hub. This flexing of the disk can cause crazing of the disk material, as well as separation of joined disks in the case of DVDs. Such forms of damage to the structure of the disk will result in misreading of the intended surface variations, rendering the disk unusable. The effects of structural damage caused by bending of the disk are magnified as digital signals are generated in double and greater densities (double-density disks) for a given surface area, and when such surface variations are applied on both surfaces of the disk (double-sided disks). Further, for the two-layer disk structures, the bending can cause a shifting of those layers with respect to one another. This can lead to the two being out of concentricity with one another, thereby affecting the aperture dimensions and causing surface variation misreadings.

One recognized solution to the problem of forced bending was described by Gelardi et al. in U.S. Pat. No. 4,793,480. Gelardi teaches a disk storage container having a pivotal tongue on which the disk resides when retained in the container. When the container is opened, the tongue pivots outwardly so as to "present" the disk to the user. As with the prior standard CD containers, the Gelardi structure is formed of four components, the base, the pivotable lid that encloses the CD when clamped onto the base, and a CD hub plate, and a tongue that detachably connects to the base and the lid. The tongue is formed of a plurality of pieces and does pivot, but only a limited distance, away from the base when the lid is opened.

While the tongue of the Gelardi container provides a desirable solution to the problem of the suitability of the fit between the hub and the CD, there are several deficiencies in that design that make it less than commercially desirable. First, the Gelardi container does not lend itself to the standard automated disk packaging processes in existence. Specifically, the pivotal disk holder is fixed to the base and to the lid in a manner that permits it to move up to a limited angle away from the base. The maximum distance that the holder moves away from the base is insufficient to allow standard automated graphics insertion equipment to place information materials into the base of the container. Therefore, in order for the Gelardi container to be viable in large-scale processing, the processing equipment would have to be modified, or the holder removed from the base-to-lid coupling, the informational materials inserted in the base, and then the holder re-applied to the base-lid coupling. Such a significant modification to the process is not possible.

Secondly, the cost to manufacture the relatively complex Gelardi container renders it difficult to provide in a mass-market environment. That is, the Gelardi container is designed to be formed of at least four separate pieces, each of which must be formed separately and then all fit together. The cost effectiveness of creating a commercially viable product of multiple parts is generally compromised as a function of the number of parts, the variability of their dimensions during fabrication, and with the increase of possible failure at the multiple connection locations.

Finally, the interface coupling between the lid and the base of the Gelardi container limits the extent to which the lid may be opened away from the base. Specifically, the lid may not pass beyond 180° away from the base. While this is ordinarily sufficient in most automated disk packaging processes, a disk case having the ability to rotate the lid beyond that range would provide greater flexibility for the disk-packaging manufacturer if desired. That is, it may be desirable to be able to pivot the lid more than 180° away from the base in order to increase the automated processing options available to the disk packager.

Relatedly, it has been observed that some disk storage containers are designed in a manner such that the lid may be separated from the base fairly easily, particularly under expected consumer usage. Once the lid has been removed, it can be difficult for the user to re-apply it and, in some instances, may not attempt to, thereby exposing the disk retained within to a greater potential for damage. Further, the material typically used to form the storage cases is made of polycarbonate, as earlier noted. Unfortunately, this transparent material is quite brittle and can either crack under a variety of stress conditions—such as by banging against a fixed surface, or by being dropped. In addition, even if the brittle case does not fail, its rigidity can translate impact conditions directly to the disk contained therein, thereby causing its failure. It would be desirable to have a disk case that can withstand high-stress loading and that can protect, to a degree, the disk under such conditions.

As earlier noted, there are a variety of types of mass storage structures, other than the ubiquitous 640 megabyte CD, used to retain massive amounts of information on a relatively small medium. Increasingly, the digital-video (or digital versatile) disk (DVD) storage structures have been employed in order to store much greater quantities of data—on the order of 17 gigabytes or more. This has enabled the application of relatively complex multimedia presentations, such as full-length feature films, for example, onto laser readable materials. It is well known that such storage provides for much better information presentation than conventional tape-based cassette. In addition, the DVD is generally a more robust medium than tape.

With the introduction of DVDs, there has yet to be established a convention in regard to the holders and storage containers for such disks. As a result, there exists a wide array of DVD containers and cases. Some are similar to conventional CD containers in that they come in three parts, the base, the lid and the removable hub plate. Others come as one or two-piece units with various forms of lid capturing mechanisms as well as various types of graphics retention devices. All come with some form of disk-retaining recess having at its center a hub for coupling to the inside diameter of the disk. Of course, with such pressure-fit hub-based designs there remains the concern of the integrity of the fit between the hub and the disk. This is of concern in the case of a too-tight fit between the disk and the hub, particularly, for a double-density and/or double-sided disk having many more pits and peaks subject to structural damage upon bending of the disk to remove it from the hub. Apart from that, it is not particularly desirable to have a variety of disk containers as it makes it much more difficult to establish standardized disk packaging equipment and processes.

Therefore, what is needed is a container for mass-media storage disks that may be used in conventional automated disk packaging processes with limited modifications to existing automation movements. What is also needed is a disk container that provides for adequate retention of the disk within the container but without causing undue stress on the disk during the process of removing it from the container. Further, what is needed is a disk container that is relatively inexpensive to produce and that is formed of a minimal number of parts easily coupled together. Still further, what is needed is such a disk container that is designed to present the disk for easy removal and that is formed of a material of improved pliability as compared to existing disk cases. Also, what is needed is a disk container having a lid-and-base arrangement that limits the separation of those components under expected use conditions.

SUMMARY OF THE INVENTION

It is an object of the present invention to provide a container for mass-media storage disks that may be used in conventional automated disk packaging processes with minimal change to the automation movements presently in use. It is also an object of the present invention to provide a disk container that retains the disk within the container but without causing undue stress on the disk during the process of removing it from the container. Further, it is an object of the present invention to provide a disk container that is relatively inexpensive to produce and that is formed of a minimal number of parts easily coupled together. Still further, it is an object of the present invention to provide a disk container that is designed to present the disk for easy removal and that is formed of a material of improved pliability as compared to existing disk cases. It is also an object of the present invention to provide a disk container having a lid-and-base arrangement that limits the separation of those components under expected use conditions.

These and other objects of the present invention are achieved by providing a two-piece disk container or case having as a portion of one of the two pieces a pivotable flap for retaining the disk thereon. It is contemplated that the disk container may retain any sort of mass storage disk including, but not limited to, CDs, DVDs, computer memory disks and the like. The two pieces of the case may be formed of any suitable material including, but not limited to, relatively pliable viscoelastic materials such as polypropylene and polyethylene. Forming the case of such a material minimizes structural failure of the case under high-stress conditions (such as dropping) and further protects, to a degree, the disk within under such conditions.

One of the two pieces of the case of the present invention is a base and the other is a lid that is detachably affixable to tie base by way of a pair of rotatable cams. The base includes a pair of opposing sidewalls, a pair of opposing endwalls, and a transparent faceplate, all of which are integrally formed together. The dimensions of the endwalls and the sidewalls substantially define the dimensions of the case, which dimensions are selectable by the manufacturer or end producer of the disks to be packaged in the case. Each of the sidewalls includes at corresponding opposing ends adjacent to one of the endwalls cam-receiving slots. The cam-receiving slots are designed to provide a releasable interference fit with the rotatable cams of the lid. The use of a cam rather than a rotatable pin enables rotation of the lid away from the base at an angle greater than 180°. This gives the user of the case of the present invention more processing options in that the case can be more easily adapted to various automated processing environments. The arrangement of a cam and a capturing slot also limits the opportunity of the lid to become dislodged from the base under a wide array of actual-use conditions. The inside perimeter of the lid should, and the inside perimeter of the base may, have one or more materials-retention tabs for removably capturing in place on the transparent faces thereof any graphic or informational material to be included with the disk. The sidewalls and a front endwall of the lid are designed to couple the lid to the base when the case is closed by way of an interference fit, locking tabs, or other suitable means.

The endwall of the base of the case that is adjacent to the cam slots also includes integrally formed therewith a disk retaining tray that is joined to that endwall by way of a living hinge. The living hinge is designed to permit pivotal movement of the tray away from the base at a significant angle that may be more than 180° from the base. The living hinge thus enable a manufacturer to swing the tray out of the way of any equipment needed to insert informational material onto the face plate of the base. It is to be noted that the use of cams as part of the base rather than a substantially cylindrical pin enables opening of the lid as wide as desired while minimizing the movement of the tray away from the base plate. Specifically, when the lid is first opened, the longer portions of the cams first contact the tray and force the tray up away from the faceplate to present the disk to the end user. As the lid continues to open and rotates away from the base, the shorter regions of the cams contact the tray to keep it in position, but they do not cause continual upward movement of the tray.

The tray may be of various forms; however, in its preferred design, the tray includes a first structural flange attached to the living hinge, a second drop-down transition region attached to the structural flange, a flap region attached to the transition region and terminating in a recess region. A key feature of the recess region is a modified unitary disk hub rising from the surface of the recess at an end thereof. The disk hub of the present invention includes an upper partially elongated tongue region and a lower capturing structure that acts in opposing bias with respect to the tongue so as to retain the disk thereon. A trunk of the hub spaces the tongue and the capturing structure away from the surface of the recess and is the portion of the retainer tray that contacts the surface of the inside perimeter of the aperture of the disk retained thereon.

The tongue and capturing structure act to capture the disk in place in that their overall dimensions are greater than that of the disk aperture. However, the hub is configured so that the disk may be slipped over the tongue until it rests up against the capturing structure, with the tongue releasably locking the disk in place. This arrangement is less sensitive to dimensional differences between the hub and the disk aperture. Specifically, the larger dimensions of the tongue region keep the disk in place and the smaller dimensions of the hub trunk and capturing structure enable easy removal of the disk from the hub without causing undue stress on the disk structure. By providing a disk-retaining system that includes two opposing components designed to bias against each other the force that each applies to the inner diameter of the disk aperture, the present invention ensures retention of the disk with greater flexibility in regard to the dimensions of those components. That is, the arrangement of the opposing components provides greater dimensional leeway in the formation of those components relative to the dimensional leeway available with the centered unitary rosette configurations currently used in commercially available disk cases. To that end, the capturing structure that opposes the tongue is preferably formed with some flexibility and may therefore be formed as a spring-like element, such as a hook or Z-shape configuration.

The combination of the novel retention tray, the living hinge, and the pivotable captured cams of the base piece of the case of the present invention make for a disk container that is easily usable in a wide array of automated disk manufacturing and packaging processes. The faceplates of the lid and the base are designed to accept any conventional form of informational and graphic material. The modified hub permits easy affixation and removal of a disk from the retention tray without significant modification of the automated processing arid, importantly, without stressing the disk. Forming the case of only two easily coupled pieces using relatively low-cost materials makes the present invention commercially desirable.

These and other advantages of the present invention will become more apparent upon review of the following detailed description and the accompanying drawings.

BRIEF DESCRIPTION OF THE DRAWINGS

FIG. 6A is a perspective view of a hook-shaped embodiment of the capturing structure of the disk retention plate of the disk storage case of the present invention.

FIG. 6B is a perspective view of a Z-shaped embodiment of the capturing structure of the disk retention plate of the disk storage case of the present invention.

FIG. 8 is a perspective view of the bottom and back of the disk storage case of the present invention.

DETAILED DESCRIPTION OF THE PREFERRED EMBODIMENT OF THE INVENTION

Figure 1:
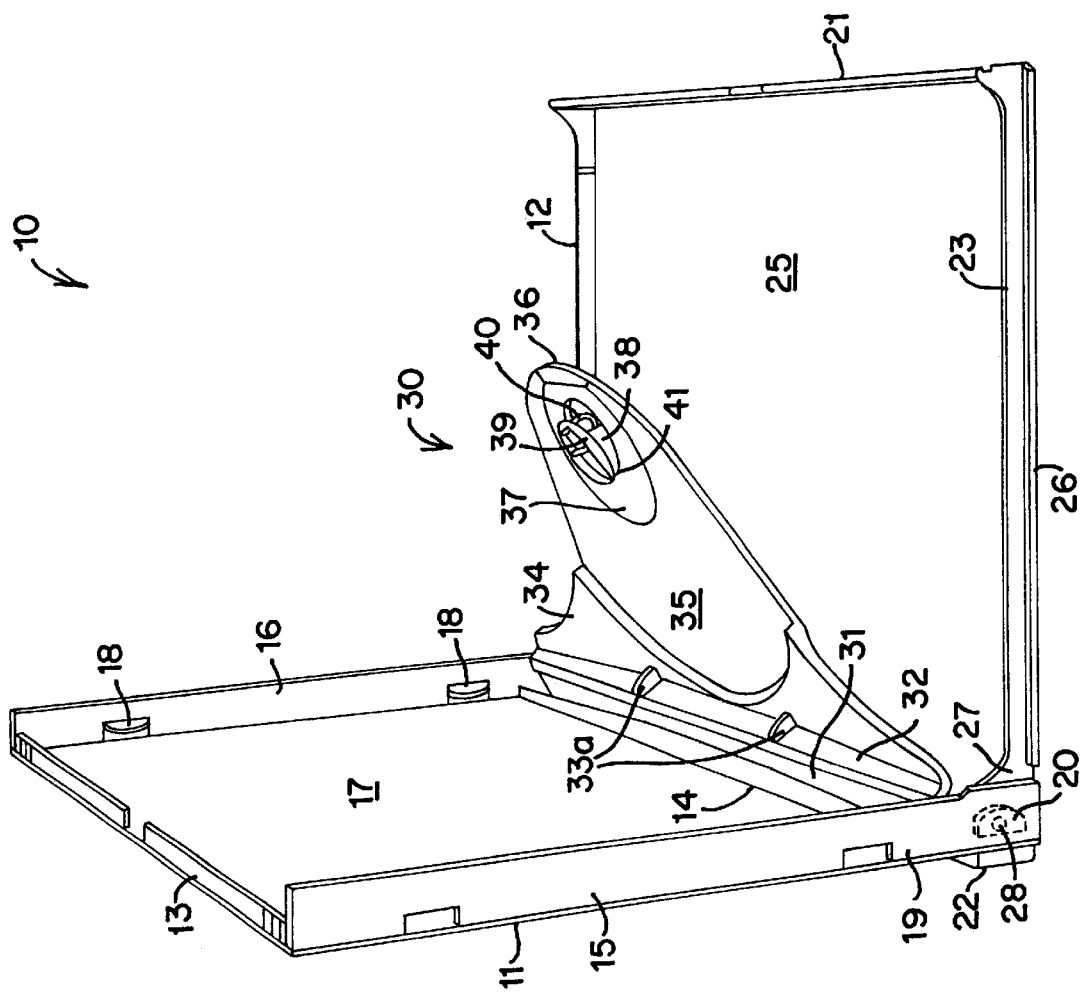
FIG. 1 is a perspective view of the disk storage case of the present invention shown partially open.
Figure 2:
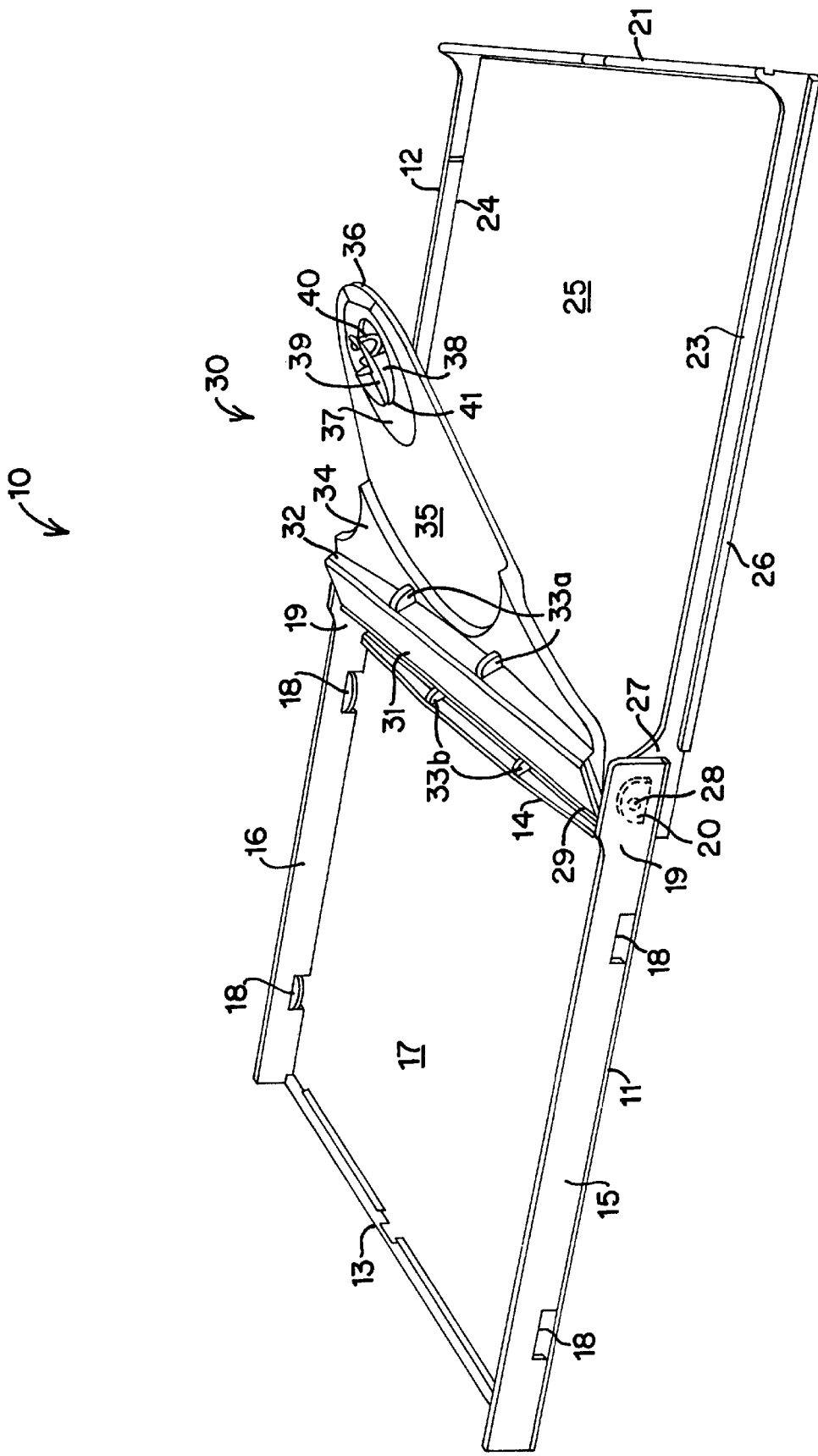
FIG. 2 is a perspective view of the disk storage case of the present invention shown completely open.

A disk storage case 10 of the present invention is shown in FIGS. 1–8. As shown in FIGS. 1 and 2, the case 10 includes a lid 11 and a base 12. The lid 11 and the base 12 may be fabricated of any manufactured material, preferably an impact-resistant viscoelastic material including, but not limited to, polypropylene or polyethylene, for example. The lid 11 includes a front endwall 13, a back endwall 14, a first sidewall 15, a second sidewall 16, and a cover face 17. The front endwall 13 and the two sidewalls 15 and 16 are designed to provide an interference friction fit with the base 12. The dimensions of the components of the lid 11 and the base 12 may be adjusted as desired in order to fit informational material, graphical material, and disks of selectable sizes therein.

Each of the sidewalls 15 and 16 may include one or more retention tabs 18 for removably retaining to the cover face 17 graphical materials of interest in a manner similar to the graphics retainers used in conventional CD cases. At an end region 19 of each of the sidewalls 15 and 16 is a rotatable cam 20 (shown for one of the sidewalls only in the drawings) that forms an integral part of such end regions 19. The cams 20 are designed to detachably couple the lid 11 to the base 12 in a manner that permits the lid 11 to swing away from the base 12 at an angle greater than 180°. As indicated, the storage case 10 of the present invention, including the lid 11 and the base 12, is preferably made of a viscoelastic material, such as polypropylene or polyethylene. As is well known in the fabrication of such viscoelastic materials, a mold in the shape of the part to be fabricated is used to receive the material to be formed, such as a polypropylene material. In regard to the lid 11 of the present invention, that portion of the case 10 is preferably formed as a unitary, integral part. For example, the rotatable cams 20 of the respective sidewalls 15 and 16 of the lid 11 can be made by creating a mold that includes a cam region with a cam head region and a cam neck region sized such that the cam neck is of smaller dimensions than the slot into which it fits and the cam head is of larger dimensions than the slot into which the cam neck fits.

The base 12 includes a front endwall 21, a back endwall 22, a first sidewall 23, a second sidewall 24, and a base face 25. The lid face 17 and the base face 25 are preferably transparent. The endwalls 21 and 22 are preferably designed of sufficient dimensions to retain within the base 12 graphic or informational materials of interest. Specifically, the endwall 22 may act much like a transparent spine of a conventional CD case. The sidewalls 23 and 24 may include sidewall shoulders 26 on which the lid sidewalls 15 and 16 may rest when the case 10 is in a closed position. At an end region 27 of each of the sidewalls 23 and 24 near the endwall 22 a cam slot 28 (shown in FIGS. 3–6) acts to capture the cams 20 for detachably coupling the lid 11 and the base 12 together. Again, the storage case 10 of the present invention, including the lid 11 and the base 12, is preferably made of a viscoelastic material, such as polypropylene or polyethylene. As is well known in the fabrication of such viscoelastic materials, a mold in the shape of the part to be fabricated is used to receive the material to be formed, such as a polypropylene material. In regard to the base 12 of the present invention, that portion of the case 10 is also preferably formed as a unitary, integral part. For example, the cam slots 28 of the respective sidewalls 23 and 24 of the base 12 can be made by creating a mold that includes a cam slot region sized such that the cam neck rotatably fits therein and the cam head cannot pass therethrough.

The base 12 also includes a living hinge 29 that is preferably integrally formed to the back endwall 22. The living hinge 29 is also formed integrally to a disk retainer 30 of the base 12. The disk retainer 30 includes a structural flange 31 coupled to the living hinge 29, a drop-down wall 32 connected to and angled from the flange 31 and having one or more guide ribs 33a designed to be aligned with lid guide ribs 33b, and a disk retention plate 34. While the case 10 may be formed without guide ribs 33a and 33b, it has been determined that by forming the case 10 of relatively flexible material, the disk retainer 30 and the lid 11 are sufficiently flexible to cause them to catch against one another, resulting in what may be seen to be an undesirable clicking noise as the lid is opened or closed. In order to avoid this condition, guide ribs 33a and 33b are designed to be aligned with one another so as to ensure that the lid 11 and the disk retainer 30 will not catch on one another. As earlier noted in regard to making the cams 20 and the cam slots 28, the guides 33a and 33b, are preferably made of a viscoelastic material as integral parts of the living hinge 29 of the base 12. As is well known in the fabrication of such viscoelastic materials, a mold in the shape of the part to be fabricated is used to receive the material to be formed, such as a polypropylene material. In regard to the living hinge 29 of the present invention, that portion of the case 10 is preferably formed as a unitary, integral part. In particular, the guide ribs 33a and 33b can be made by creating the mold for the base 12 with a guide ribs region with extending from the drop-down wall region of the living-hinge 29 like structural reinforcement flanges. This type of fabrication is well understood by plastics fabricators.

The disk retention plate 34 may be of any desired shape, but is preferably minimized in order to reduce cost and to take up as little space as possible, without compromising the structural integrity required to support a disk thereon. The retention plate 34 includes associated therewith a disk recess 35 on which a portion of a disk surface may rest. The radius of the recess 35 is preferably slightly greater than the radius of the disk to be retained. At a forward end 36 of the plate 34, a first hub 37 preferably extending slightly above the surface of the recess 35 acts as a seat of the annular ring of the disk. A second disk holding hub 38 is substantially centered in the first hub 37 but extends a greater distance above the surface of the recess 35. The holding hub 38 includes a tongue 39 extending above the recess 35, a capturing structure 40 (or optionally, a plurality thereof, extending back toward the recess 35, and a trunk 41 that links the tongue 39 and the capturing structure 40 to the surface of the recess 35.

Figure 3:
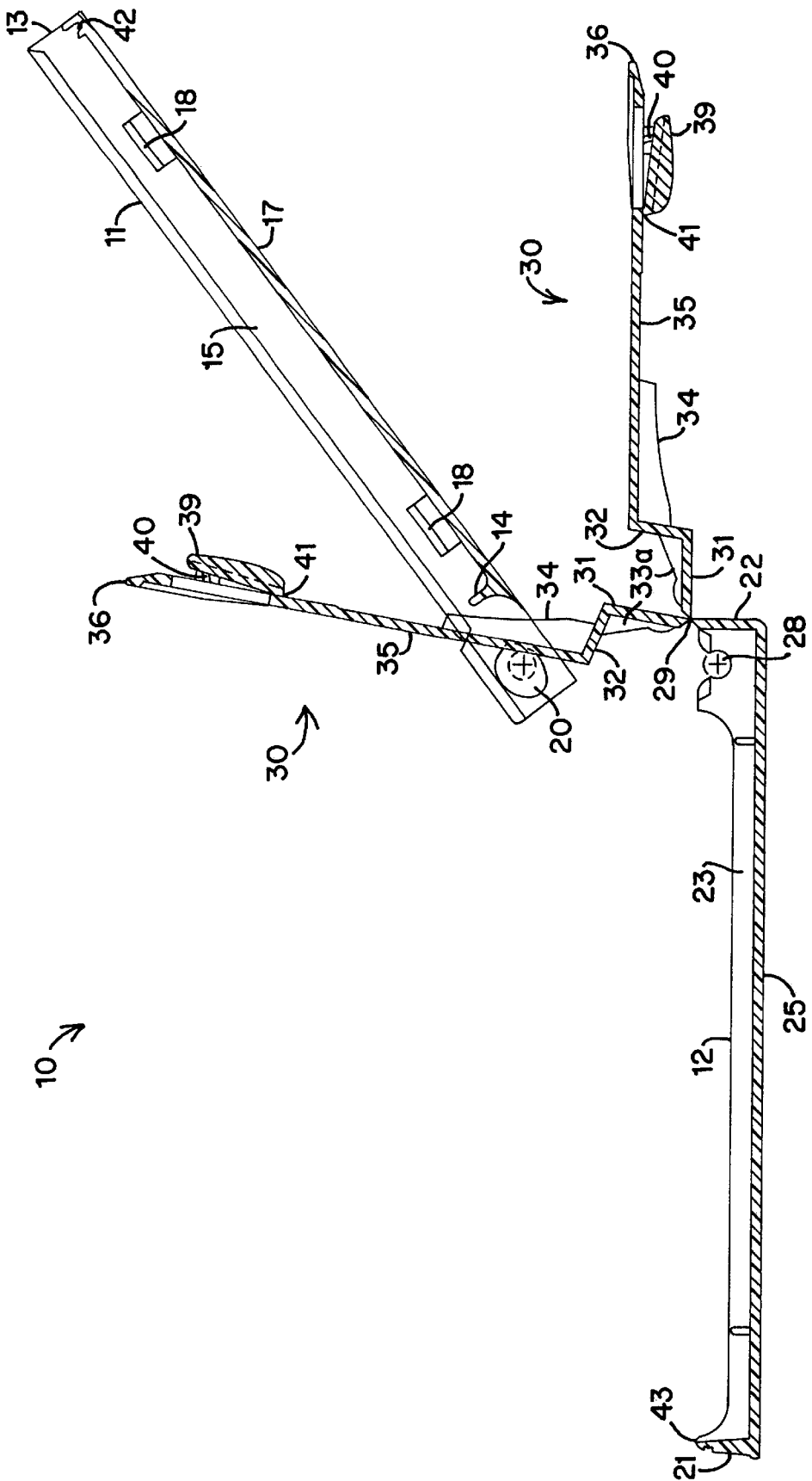
FIG. 3 is a simplified sectional view of the lid and the base of the storage case of the present invention, showing the lid decoupled from the base and two optional positions of the pivotable disk tray.

FIG. 3 illustrates the lid 11 and the base 12 disconnected from one another. It further shows that the living hinge 29 enables a manufacturer to move the retainer 30 to a variety of positions with respect to the base 12 with lid 11 in place. It can further be seen that use of the cams 20 fittable into the cam slots 28 permit rotational movement of the retainer 30 without causing a decoupling of the lid 11 from the base 12. FIG. 3 also shows that the front endwall 13 of the lid 11 includes a friction fit slot 42 capable of retaining the closed lid 11 in place by its force fit onto tip 43 of the front endwall 21 of the base 12. It is to be noted that the arrangement of the cams 20 and the cam slots 28 is further designed to ensure that the lid 11 remains captured in relation to the base 12 under expected processing and use conditions. That is, the lid 11 cannot easily be dislodged from the base 12 because the cams 20 cannot be forced through the cam slots 28 such as by pulling the walls 23 and 24 away from one another.

Figure 4:
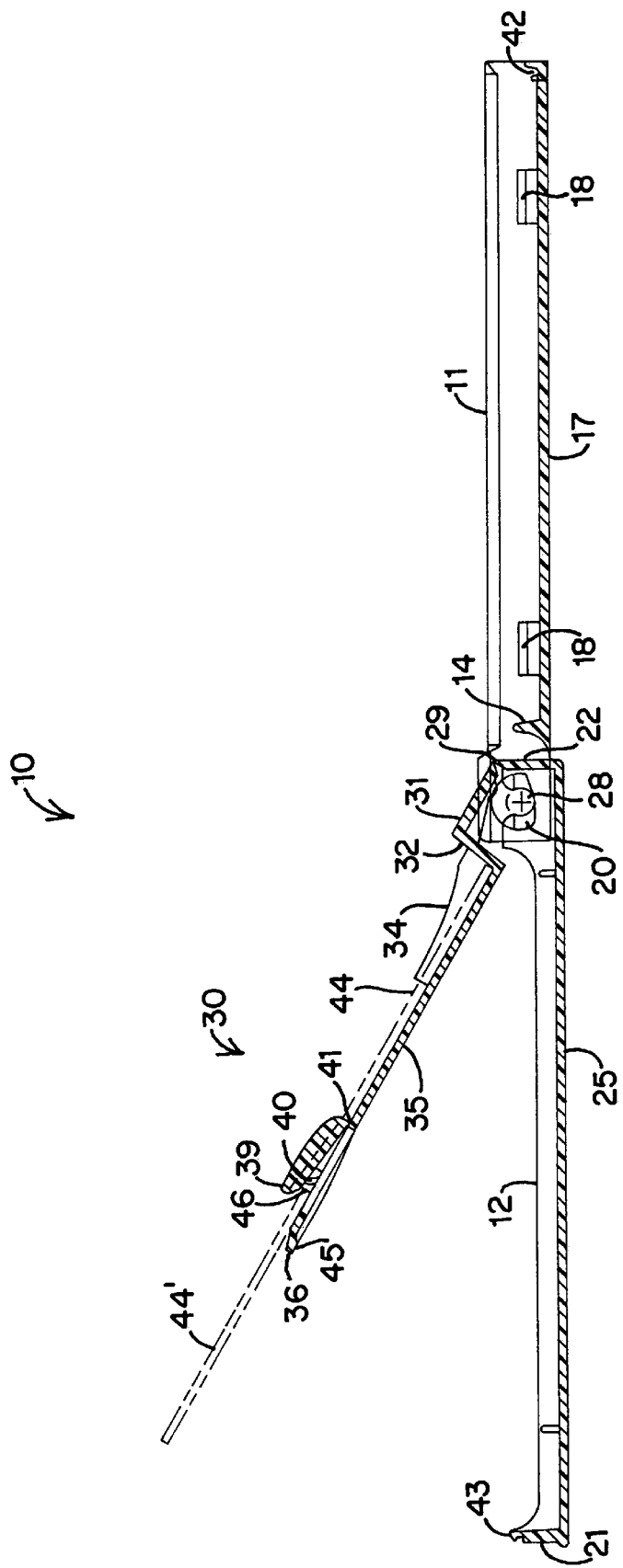
FIG. 4 is a simplified sectional view of the lid and the base of the disk storage case of the present invention with the cover spaced 180° from the base and the tray in a disk-presenting position with a disk thereon.

FIG. 4 shows the case 10 of the present invention in a standard open position with the process for applying a disk 44 onto the retainer 30. It can be seen in this and the other figures that the tongue 39 extends beyond the spacing of the capturing structure 40 with respect to the trunk 41. In this way, the disk 44 may have its aperture pass over the tongue 39 by angling the disk 44 over it in a position identified as disk 44 such that the disk 44 contacts a tip 45 of the end 36 of the retainer 30. As the disk 44 is straightened into a position represented as disk 44', it drops below region 46 of the tongue 39 such that the surface of the inner diameter of the disk 44' contacts the tooth 40 and the trunk 41. Through this design, the interface dimensions between the disk's aperture and the tongue-based hub arrangement of the present invention is not as critical as it had been in the past. Instead, the disk 44, 44' may be easily applied to, and removed from, the retainer 30 with little to no stress thereon. Moreover, when the case 10 is in a closed position, the cooperation between the tongue 39 and the lid guide rib 33b ensure that the disk 44 will not become dislodged and move about freely within the case 10.

Figure 5:
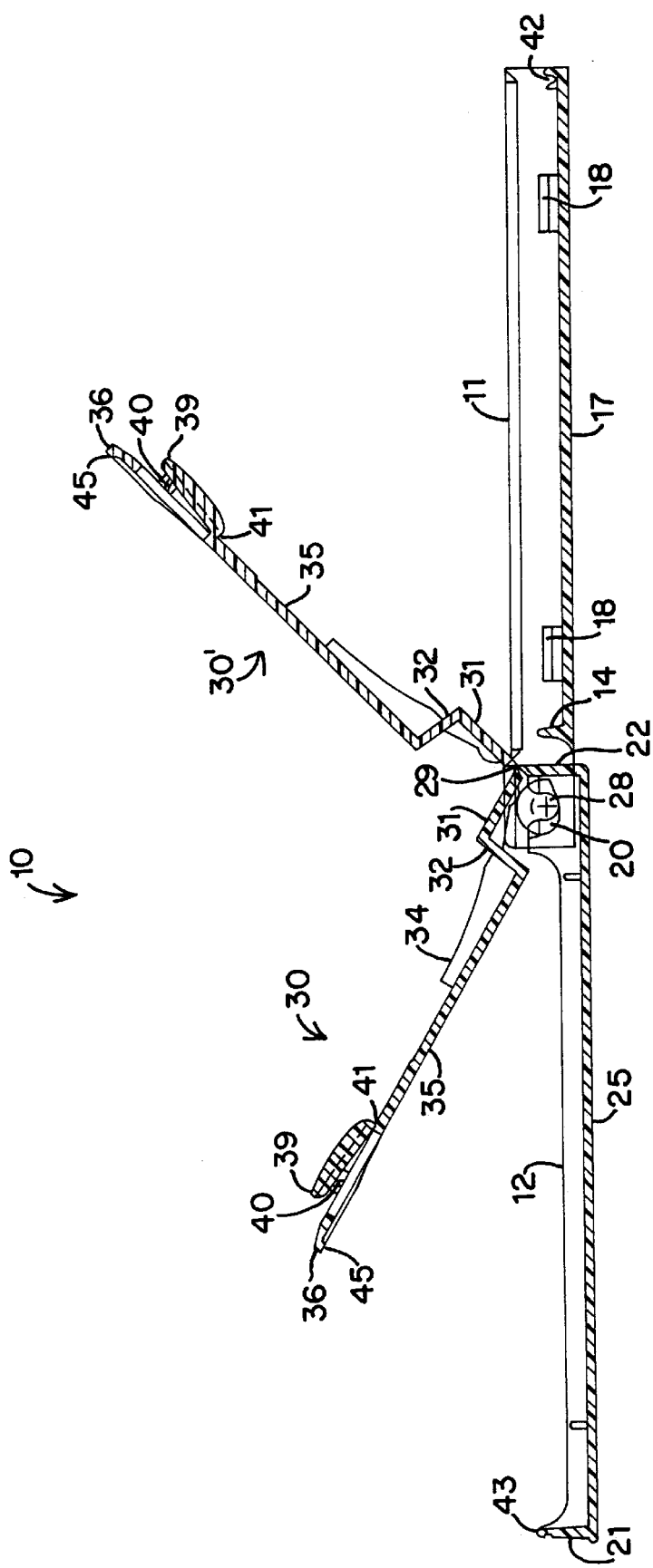
FIG. 5 is a simplified sectional view of the lid and the base of the disk storage case of the present invention with the cover spaced 180° from the base and the tray shown in two optional positions without a disk thereon.

FIG. 5 illustrates the case 10 of the present invention with the lid 11 and the base 12 coupled together and the retainer 30 in two of a plurality of rotatable positions. In a first position represented by retainer 30, the retainer 30 is in a standard position for applying or removing the disk 44. Prior "presentation" cases were limited in that they would only permit the tray to extend substantially to that position and no farther away from the base 12. As a result, it can be seen in FIG. 5 that conventional graphics insertion equipment used to insert graphics and informational material onto the face 25 of the base 12. However, the case 10 of the present invention includes the living hinge 29 and the cams 20 in an arrangement that permits the retainer 30 to be moved much farther away from the base 12, for example, into a position represented by retainer 30'. In this way, the retainer 30' can be moved out of the way of any conventional automated packaging equipment to permit insertion of materials into the base 12 without effect on any disk that may be on the retainer 30' or on the coupling of the lid 11 to the base 12.

Figure 6:
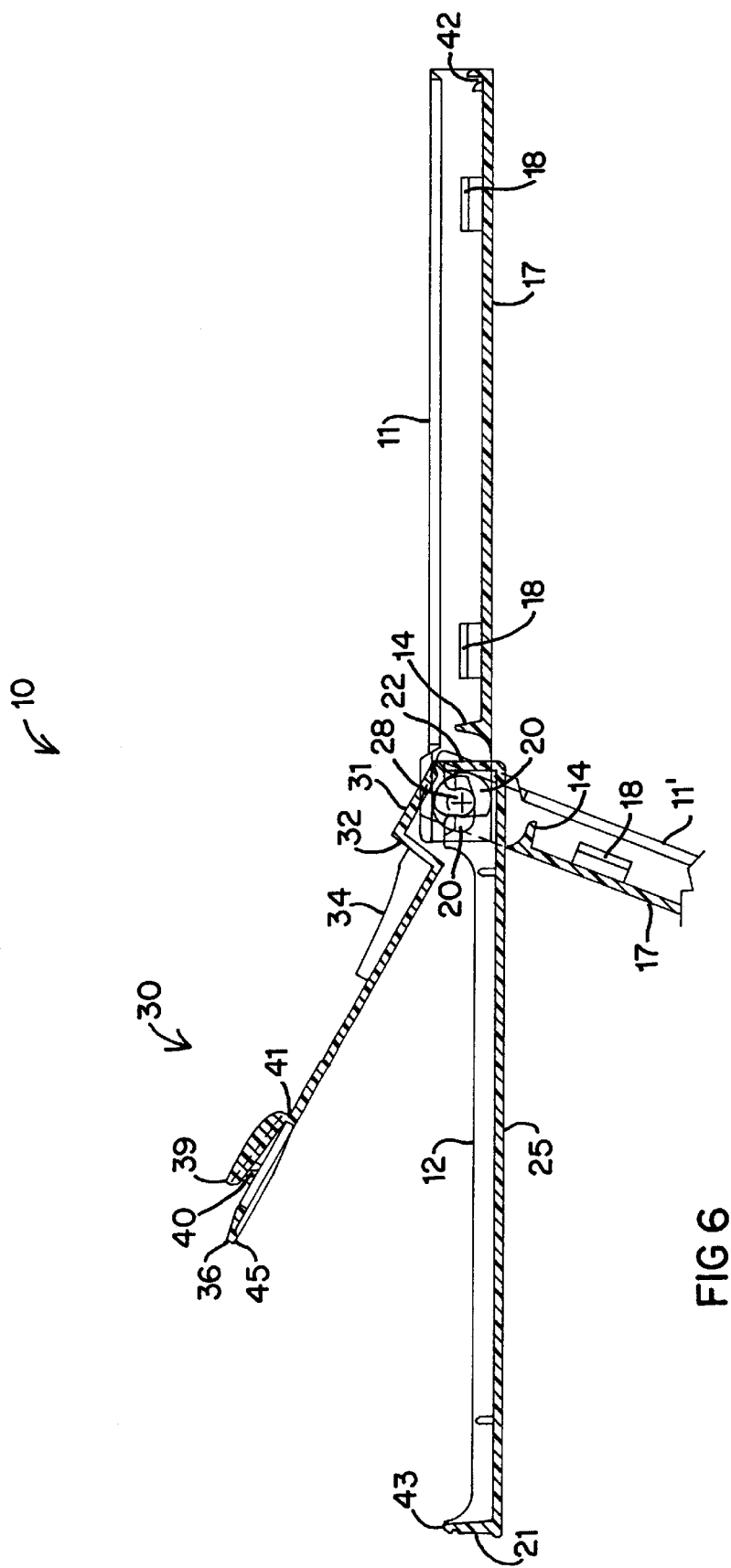
FIG. 6 is a simplified sectional view of the lid and the base of the disk storage case of the present invention with the cover shown spaced from the base in two optional positions with the tray remaining in a disk-presenting position for either lid position.

FIG. 6 shows that the cams 20 permit a user to operate the case 10 such that lid 11 may be moved to a substantial obtuse angle from the base 12 without effect on the position of the presented retainer 30. Specifically, it is to be noted that the cams 20 include a major diameter that moves the lid 11 out away from the base 12 while still coupled thereto. The cams 20 force the back endwall 14 of the lid 11 away from the back endwall 22 of the base 12 such that it can be moved to exemplar position represented by lid 11' until the back endwall 14 comes into contact with the outer surface of the base face 25. In this way, the case user and/or the disk packager has considerable flexibility in the manipulation of the various components of the case 10 without compromising or removing other components. As can be seen from the drawings, the cams 20 and the cam slots 28 are used in conjunction to enable full rotation of the lid 11 in relation to the base 12. Rotational movement of the necks of the cams 20 within the cam slots 28 effects rotational movement of the lid 11. It can further be seen that the head of each of the cams 20 is in the shape of a truncated ellipse that establishes the major diameter previously described. The cam head resides within the dimensions of the base 12 such that when the lid 11 is opened, the major diameter of the cam head is forced against the base face 25, thereby forcing the lid 11 away from the back endwall 2:2 to enable complete rotation. The cam slots are simply used to enable the rotation of the cam necks of the cams 20. Since the living hinge 29 forms part of the base 12, the complete rotational movement of the lid 11 enabled by the cams 20 and slots 28 arrangement, enables complete rotational movement of the retainer 30 as described.

Guide ribs 33a and 33b assist in smooth opening and closing of the lid 11 in that they are used to ensure that the back endwall 14 of the lid 11 does not get "hung up" on the interior surface of the drop-down wall 32 of the base 12. As shown in the drawings, the ribs 33a/33b are of curved dimensions such that as the lid is moved upwardly or downwardly in an opening or a closing manner and the endwall 14 approaches the drop-down wall 32, the endwall 14 is naturally and gradually forced outwardly (on opening) or inwardly (on closing) so that complete and smooth lid movement is ensured.

FIG. 6A shows one alternative embodiment of the capturing structure 40. Specifically, capturing structure 40' is formed as a spring-like hook-shaped structure passing through an opening of the tongue 39 and terminating at a back-end thereof. The capturing structure 40' in relation to the tongue 39 has sufficient give to provide a tight fit to the inner diameter of the disk 44 without causing damage thereto. Similarly, FIG. 6B shows a second alternative embodiment of the capturing structure 40. Specifically, capturing structure 40" is formed as a spring-like Z-shaped structure passing through an opening of the tongue 39 and terminating at a back-end thereof. The capturing structure 40" in relation to the tongue 39 has sufficient give to provide a tight fit to the inner diameter of the disk 44 without causing damage thereto. Either of the noted configurations of the capturing structure provide, in combination with the tongue 39, a disk-retaining bias caused by the opposing forces applied thereto by the tongue 39 and the structure 40 that reduces significantly the possibility that the disk can be dislodged from the disk retainer 30 when the case 10 is dropped or the disk 44 is otherwise jolted.

Figure 7:
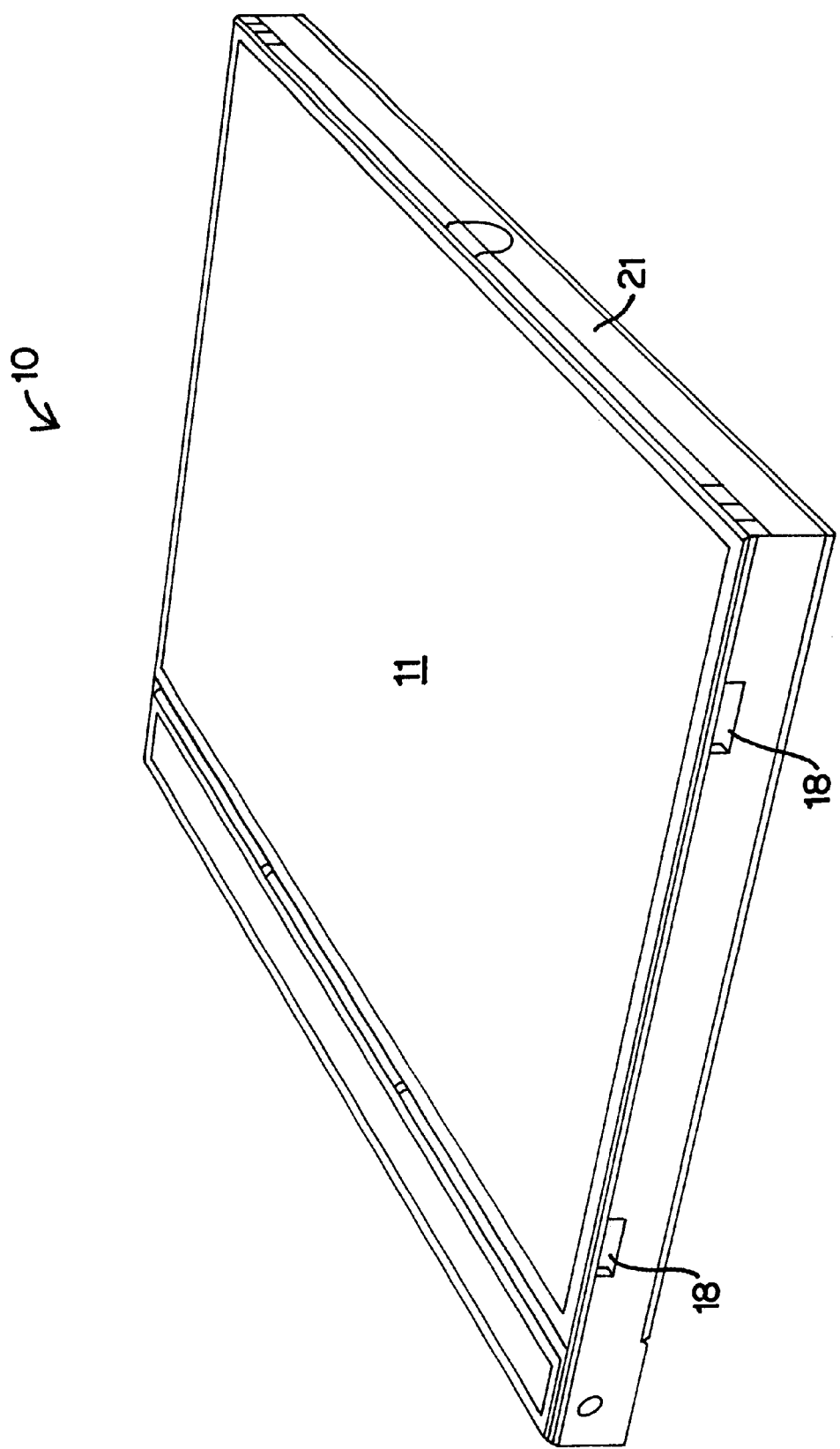
FIG. 7 is a perspective view of the front and top of the disk storage case of the present invention.

Finally, FIGS. 7 and 8 illustrate that in its closed position, the case 10 outwardly appears to be substantially the same as the existing CD case structures commercially available. That is, the novel combination of the two components, the lid 11 and the base 12, are coupled together in a unique way and include a unique disk-retaining element, yet the overall appearance of the case 10 is familiar to purchasers of such structures.

The case 10 of the present invention provides a two-piece device suitable for introduction into an array of automated disk packaging systems. It further provides for a reduction of the stress on the disk otherwise required to place and remove the disk with respect to the retention hub. Further, the case 10 of the present invention may be formed in an array of sizes from relatively inexpensive materials in relatively inexpensive fabrication processes, thereby making it commercially desirable.

Although the present invention has been described and illustrated with specific reference to certain detailed designs, it will be apparent to those skilled in this field that alternative embodiments will achieve the same results without deviating from the basic concept of the invention. All such embodiments and their equivalents are deemed to be within the scope of the invention as set cut in the description.

What is claimed is:

1. A disk case comprising:
   a. a lid having a pair of opposing sidewalls and a pair of opposing endwalls, spaced from one another by a lid face, wherein each of said opposing sidewalls includes a rotatable cam; and
   b. a base having a pair of opposing sidewalls and a pair of opposing endwalls, spaced from one another by a base face, wherein each of said opposing sidewalls of said base includes a cam slot for retaining therein a corresponding one of said rotatable cams of said lid, wherein each of said cams of said lid includes a cam head having a truncated elliptic shape, and wherein one of said opposing endwalls of said base is integrally formed with a disk retainer that is designed to extend into a space between said lid and said base for receiving and retaining a disk thereon.

2. The disk case as claimed in claim 1 wherein said one of said endwalls is coupled to said disk retainer by a living hinge.

3. The disk case as claimed in claim 2 wherein said disk retainer includes a recess section terminating in a disk-retention hub, wherein said disk retention hub includes a tongue and an opposing capturing structure coupled to a surface of said recess section by a trunk, wherein said tongue and said capturing structure act with opposing bias to retain the disk therebetween.

4. The disk case as claimed in claim 1 wherein said disk retainer includes a recess section terminating in a disk-retention hub, wherein said disk retention hub includes a tongue and an opposing capturing structure coupled to a surface of said recess section by a trunk, wherein said tongue and said capturing structure act to retain the disk therebetween.

5. The disk case as claimed in claim 1 wherein said cams enable rotation of said lid to an angle of more than 180° away from said base.

6. The disk case as claimed in claim 5 wherein said one of said endwalls is coupled to said disk retainer by a living hinge.

7. The disk case as claimed in claim 6 wherein said living hinge is designed to enable rotation of said disk retainer to an angle of more than 180° away from said base.

8. The disk case as claimed in claim 1 wherein said lid and said base are fabricated of polypropylene.

9. The disk case as claimed in claim 4 wherein said capturing structure is a Z-shaped structure.

10. The disk case as claimed in claim 4 wherein said capturing structure is a hook-shaped structure.

11. A disk case comprising:
    a. a lid having a pair of opposing sidewalls and a pair of opposing endwalls, spaced from one another by a lid face, wherein each of said opposing sidewalls includes a rotatable cam; and
    b. a base having a pair of opposing sidewalls and a pair of opposing endwalls, spaced from one another by a base face, wherein each of said opposing sidewalls of said base includes a cam slot for retaining therein a corresponding one of said rotatable cams of said lid, wherein one of said opposing endwalls of said base is integrally formed with a disk retainer that is designed to extend into a space between said lid and said base for receiving and retaining a disk thereon, wherein said disk retainer includes one or more guide ribs on a drop-down wall thereof.

* * * * *